(12) United States Patent
Martin et al.

(10) Patent No.: US 10,738,917 B2
(45) Date of Patent: Aug. 11, 2020

(54) ASSEMBLY FOR PRODUCING A THREADED CONNECTION FOR DRILLING AND OPERATING HYDROCARBON WELLS, AND METHOD FOR PRODUCING SUCH A THREADED CONNECTION

(71) Applicants: VALLOUREC OIL AND GAS FRANCE, Aulnoye-Aymeries (FR); NIPPON STEEL CORPORATION, Chiyoda-ku (JP)

(72) Inventors: Pierre Bernard Martin, Marly (FR); Sebastien Colin, Bantouzelle (FR); Xavier Mencaglia, Gommegnies (FR); Karine Ruffin, Aubry-du-Hainaut (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 776 days.

(21) Appl. No.: 14/899,446

(22) PCT Filed: Jun. 17, 2014

(86) PCT No.: PCT/EP2014/062627
§ 371 (c)(1),
(2) Date: Dec. 17, 2015

(87) PCT Pub. No.: WO2014/202555
PCT Pub. Date: Dec. 24, 2014

(65) Prior Publication Data
US 2016/0146381 A1 May 26, 2016

(30) Foreign Application Priority Data
Jun. 19, 2013 (FR) .................................. 13 55760

(51) Int. Cl.
*F16L 15/00* (2006.01)
*E21B 17/042* (2006.01)
*E21B 17/08* (2006.01)

(52) U.S. Cl.
CPC .......... *F16L 15/002* (2013.01); *E21B 17/042* (2013.01); *E21B 17/08* (2013.01); *E21B 17/085* (2013.01); *F16L 15/007* (2013.01)

(58) Field of Classification Search
CPC ..... F16L 15/002; F16L 15/007; F16L 15/004; F16L 15/009; E21B 17/042; E21B 17/08; E21B 17/085
See application file for complete search history.

(56) References Cited

U.S. PATENT DOCUMENTS

| | | |
|---|---|---|
| 4,564,226 A | 1/1986 | Doherty, Jr. |
| 4,570,982 A | 2/1986 | Blose et al. |

(Continued)

FOREIGN PATENT DOCUMENTS

| | | |
|---|---|---|
| CN | 85 1 07996 A | 5/1986 |
| CN | 86 1 06732 A | 4/1988 |

(Continued)

OTHER PUBLICATIONS

International Search Report dated Sep. 8, 2014 for PCT/EP2014/062627 filed on Jun. 17, 2014.

*Primary Examiner* — David Bochna
*Assistant Examiner* — James A Linford
(74) *Attorney, Agent, or Firm* — Oblon, McClelland, Maier & Neustadt, L.L.P.

(57) ABSTRACT

A set for producing a threaded connection, includes first, second, third, and fourth tubular component with axis of revolution, the first tubular component including at each of its ends a first and a second threaded zone provided on the inner peripheral surface of the component, the second tubular component including at each of its ends a third and a fourth threaded zone provided on the outer peripheral surface of the component, the third tubular component including at one of its ends a fifth and a sixth threaded zone respectively provided on the inner and outer peripheral (Continued)

surface of the component, the fourth tubular component including at one of its ends a seventh and an eighth threaded zone respectively provided on the inner and outer peripheral surface of the component. The first and sixth, third and fifth, second and eighth, fourth and seventh threaded zones cooperate with one another on makeup.

16 Claims, 6 Drawing Sheets

(56) References Cited

U.S. PATENT DOCUMENTS

| | | | |
|---|---|---|---|
| 4,828,295 | A | 5/1989 | Plaquin et al. |
| 4,946,201 | A * | 8/1990 | Tai ..................... E21B 17/042 |
| | | | 285/334 |
| 5,452,748 | A | 9/1995 | Simmons et al. |
| 5,503,187 | A | 4/1996 | Simmons et al. |
| 5,676,406 | A | 10/1997 | Simmons et al. |
| 5,906,402 | A | 5/1999 | Simmons et al. |
| 6,409,175 | B1 | 6/2002 | Evans et al. |

FOREIGN PATENT DOCUMENTS

| | | |
|---|---|---|
| CN | 1420972 A | 5/2003 |
| CN | 102639911 | 8/2012 |
| JP | 63-129512 U | 8/1988 |
| JP | 02-105684 | 8/1990 |
| JP | 2013-511672 A | 4/2013 |
| UA | 67305 A | 6/2004 |

* cited by examiner

ASSEMBLY FOR PRODUCING A THREADED CONNECTION FOR DRILLING AND OPERATING HYDROCARBON WELLS, AND METHOD FOR PRODUCING SUCH A THREADED CONNECTION

The present invention relates to threaded connections for drilling and/or operating hydrocarbon wells, and more precisely to the optimization of the overall performance of a connection in terms of efficiency and seal when the connection works under compression/tension.

The term "threaded connections" means any assembly constituted by elements which are substantially tubular in shape, metallic and capable of being connected together by makeup with a particular view to constituting either a stem for drilling a hydrocarbon well, or a riser for maintenance (also known as a work-over riser), or for operating such a well, such as a riser, or a casing or tubing string used in operating a well.

Each tubular element comprises an end portion provided with a male threaded zone or a female threaded zone for making up with a corresponding end portion of an analogous element. When assembled in this manner, the elements make up what is known as a connection.

Such tubular threaded components of a connection are assembled under pre-set loads in order to respond to the interference fit and sealing requirements imposed by the service conditions. Furthermore, it should be noted that the threaded tubular components may have to undergo several makeup-breakout cycles, in particular when in service.

The conditions under which such threaded tubular components are used gives rise to an extensive range of mechanical loads which act on the sensitive portions of those components such as the threaded zones, abutting zones or the sealing surfaces.

For this reason, connection design specifications are complex, requiring taking a number of parameters into account simultaneously. Thus, it is recommended that the efficiency of the connection be preserved, as well as the thickness of the zone of the tubular components which bears the sealing surfaces, and that the risks of displacing the sealing contact points when the connection operates under compression/tension should be improved.

One type of solution was developed through connections of the VAM HTF© type, which use two threaded zones between which are a first sealing surface and a second sealing surface provided at the lip of the male end. That design means that good stability of the first seal located between the threaded zones can be obtained, however the second seal is located on a very thin lip which renders the function of that seal vulnerable. In addition, when the connection operates in compression/tension, the second seal is not stable because of the alternating loads. Finally, the presence of a seal in the lip of the male end reduces the efficiency of the female end.

Another type of solution was also developed in the document U.S. Pat. No. 4,570,982 A1. That type of connection has three staggered threaded portions, which means that the tapers of the three threaded zones are not coincident but are parallel. Between each of the threaded zones is a sealing surface and an abutment. However, positioning abutments adjacent to sealing surfaces weakens said surfaces because the abutments are zones which are under particular load when the amplitude of the loads is high. The threaded zones are not self-locking and exhibit gaps at the load flanks and/or the stabbing flanks. However, because of those gaps, the stability of the sealing surfaces is compromised when the connection operates in compression/tension.

One kind of solution was also developed with connections of the VAM Edge© type, which employ two self-locking threaded zones between which is a sealing surface. As was the case for the VAM HTF©, that design gives rise to good stability of the intermediate seal at the threaded zones, however in the case of a flush or semi-flush connection, the single sealing surface is insufficient as regards resisting both internal pressure and external pressure.

Connections have been developed such as, for example, VAM 21 SC80© connections. However, that type of connection is a T&C type connection, i.e. coupled, insofar as a female threaded element is provided which has a large external diameter and is short in length, coupled at each of its ends to a male threaded element with a reduced diameter and long length.

For this reason, the aim of the invention is to respond to the threefold aim consisting of preserving the efficiency of the connection, maximizing the thickness of the zone of the tubular components which bears the sealing surfaces, and avoiding risks of displacement of the sealed contact points when the connection operates in compression/tension.

More precisely, the invention concerns an assembly for producing a threaded connection, comprising a first, a second, a third and a fourth tubular component with an axis of revolution, the first tubular component being provided at each of its end surfaces with a first and a second threaded zone provided on the inner peripheral surface of the component, the second tubular component being provided at each of its ends with a third and a fourth threaded zone provided on the outer peripheral surface of the component, the third tubular component being provided at one of its ends with a fifth and a sixth threaded zone respectively provided on the inner and outer peripheral surface of the component, the fourth tubular component being provided at one of its ends with a seventh and an eighth threaded zone respectively provided on the inner and outer peripheral surface of the component, the first and sixth, third and fifth, second and eighth, fourth and seventh threaded zones being capable of cooperating together in pairs on makeup, the pitch of the first and sixth threaded zones being equal to the pitch of the fourth and seventh threaded zones AND/OR the pitch of the second and eighth threaded zones being equal to the pitch of the third and fifth threaded zones AND/OR the pitch of the first and sixth threaded zones being equal to the pitch of the third and fifth threaded zones AND the pitch of the second and eighth threaded zones being equal to the pitch of the fourth and seventh threaded zones.

Optional complementary or substitutional features of the invention are set out below.

The pitch of the first and sixth threaded zones may be equal to the pitch of the fourth and seventh threaded zones, and the sixth threaded zone of the third tubular component may have the same taper as that of the seventh threaded zone of the fourth tubular component, said taper being in the range 5% to 25%, corresponding to a tangent to the peak half angle in the range 0.025 to 0.125, and preferably a taper in the range 10% to 18%, corresponding to a tangent to the peak half angle in the range 0.05 to 0.09.

The pitch of the second and eighth threaded zones may be equal to the pitch of the third and fifth threaded zones, and the fifth threaded zone of the third tubular component may have the same taper as that of the eighth threaded zone of the fourth tubular component, said taper being in the range 5% to 25%, corresponding to a tangent to the peak half angle in the range 0.025 to 0.125, and preferably a taper in the range 10% to 18%, corresponding to a tangent to the peak half angle in the range 0.05 to 0.09.

The third tubular component may have a terminal end surface extending substantially perpendicular to the axis of revolution, said end surface being provided with a first abutment surface which is capable of cooperating in abutment with a corresponding second surface provided on a shoulder of the first tubular component and said end surface being provided with a third abutment surface which is capable of cooperating in abutment with a corresponding fourth surface provided on a shoulder of the second tubular component.

The fourth tubular component may have a terminal end surface extending substantially perpendicular to the axis of revolution, said end surface being provided with a fifth abutment surface which is capable of cooperating in abutment with a corresponding sixth surface provided on a shoulder of the first tubular component and said end surface may be provided with a seventh abutment surface which is capable of cooperating in abutment with a corresponding eighth surface provided on a shoulder of the second tubular component.

The outer peripheral surface of the third tubular component may have a shoulder provided with a first abutment surface which is capable of cooperating in abutment with a corresponding second surface provided on a shoulder of the first tubular component and its inner peripheral surface may have a shoulder provided with a third abutment surface which is capable of cooperating in abutment with a corresponding fourth surface provided on a shoulder of the second tubular component.

The outer peripheral surface of the fourth tubular component may have a shoulder provided with a fifth abutment surface which is capable of cooperating in abutment with a corresponding sixth surface provided on a shoulder of the first tubular component and its inner peripheral surface may have a shoulder provided with a seventh abutment surface which is capable of cooperating in abutment with a corresponding eighth surface provided on a shoulder of the second tubular component.

The outer peripheral surface of the third tubular component may have a non-threaded portion preceding its terminal end, provided with a first sealing surface which is capable of cooperating in a sealing interference fit with a corresponding second surface provided on the first tubular component.

The inner peripheral surface of the third tubular component may have a non-threaded portion preceding its terminal end, provided with a third sealing surface which is capable of cooperating in a sealing interference fit with a corresponding fourth surface provided on the second tubular component.

The outer peripheral surface of the fourth tubular component may have a non-threaded portion preceding its terminal end, provided with a fifth sealing surface which is capable of cooperating in a sealing interference fit with a corresponding sixth surface provided on the first tubular component.

The inner peripheral surface of the fourth tubular component may have a non-threaded portion preceding its terminal end, provided with a seventh sealing surface which is capable of cooperating in a sealing interference fit with a corresponding eighth surface provided on the second tubular component.

The sealing surfaces of the third and fourth tubular components may respectively be provided between the shoulders carrying abutment surfaces of said tubular components and the free end of said tubular components.

One of the at least one sealing surfaces may be a tapered surface, the other corresponding facing sealing surface being a toroid with a radius R in the range 2.5 to 60 mm.

The first and second tubular components may be integral such that they form a single component, the pitch of the first and sixth threaded zones then being equal to the pitch of the third and fifth threaded zones and the pitch of the second and eighth threaded zones being equal to the pitch of the fourth and seventh threaded zones.

The invention also concerns a threaded connection resulting from makeup of an assembly in accordance with any one of the assemblies described above.

The invention also concerns a first method for producing a connection, characterized in that it comprises the following steps:

providing an assembly for producing a threaded connection in accordance with the invention and in which the pitch of the first and sixth threaded zones is equal to the pitch of the fourth and seventh threaded zones and in that the sixth threaded zone of the third tubular component has the same taper as that of the seventh threaded zone of the fourth tubular component, said taper being in the range 5% to 25%, corresponding to a tangent to the peak half angle in the range 0.025 to 0.125 , and preferably a taper in the range 10% to 18%, corresponding to a tangent to the peak half angle in the range 0.05 to 0.09;

connecting the third tubular component with the second tubular component by makeup;

connecting the fourth tubular component with the first tubular component by makeup;

connecting the resultants of the preceding two steps by makeup.

Advantageously, the pitch of the first and sixth threaded zones is in the reverse direction to the pitch of the third and fifth threaded zones.

The invention also concerns a second method for producing a connection, characterized in that it comprises the following steps:

providing an assembly for producing a threaded connection in accordance with the invention and in which the pitch of the second and eighth threaded zones is equal to the pitch of the third and fifth threaded zones and in that the fifth threaded zone of the third tubular component has the same taper as that of the eighth threaded zone of the fourth tubular component, said taper being in the range 5% to 25%, corresponding to a tangent to the peak half angle in the range 0.025 to 0.125 , and preferably a taper in the range 10% to 18%, corresponding to a tangent to the peak half angle in the range 0.05 to 0.09;

connecting the fourth tubular component with the second tubular component by makeup;

connecting the third tubular component with the first tubular component by makeup;

connecting the resultants of the preceding two steps by makeup.

Advantageously, the pitch of the first and sixth threaded zones is in the reverse direction to the pitch of the third and fifth threaded zones.

The invention also concerns a third method for producing a connection, characterized in that it comprises the following steps:

providing an assembly for producing a threaded connection in accordance with the invention and in which the first and second tubular components are integral such that they form a single component, the pitch of the first and sixth threaded zones being equal to the pitch of the third and fifth threaded zones and the pitch of the second and eighth threaded zones being equal to the pitch of the fourth and seventh threaded zones;

connecting by makeup the third tubular component with the component resulting from securing the first and second tubular components together;

connecting by make up the fourth tubular component with the component resulting from securing the first and second tubular components together.

The features and advantages of the invention are disclosed in more detail in the description below, made with reference to the accompanying drawings.

Figure 1:
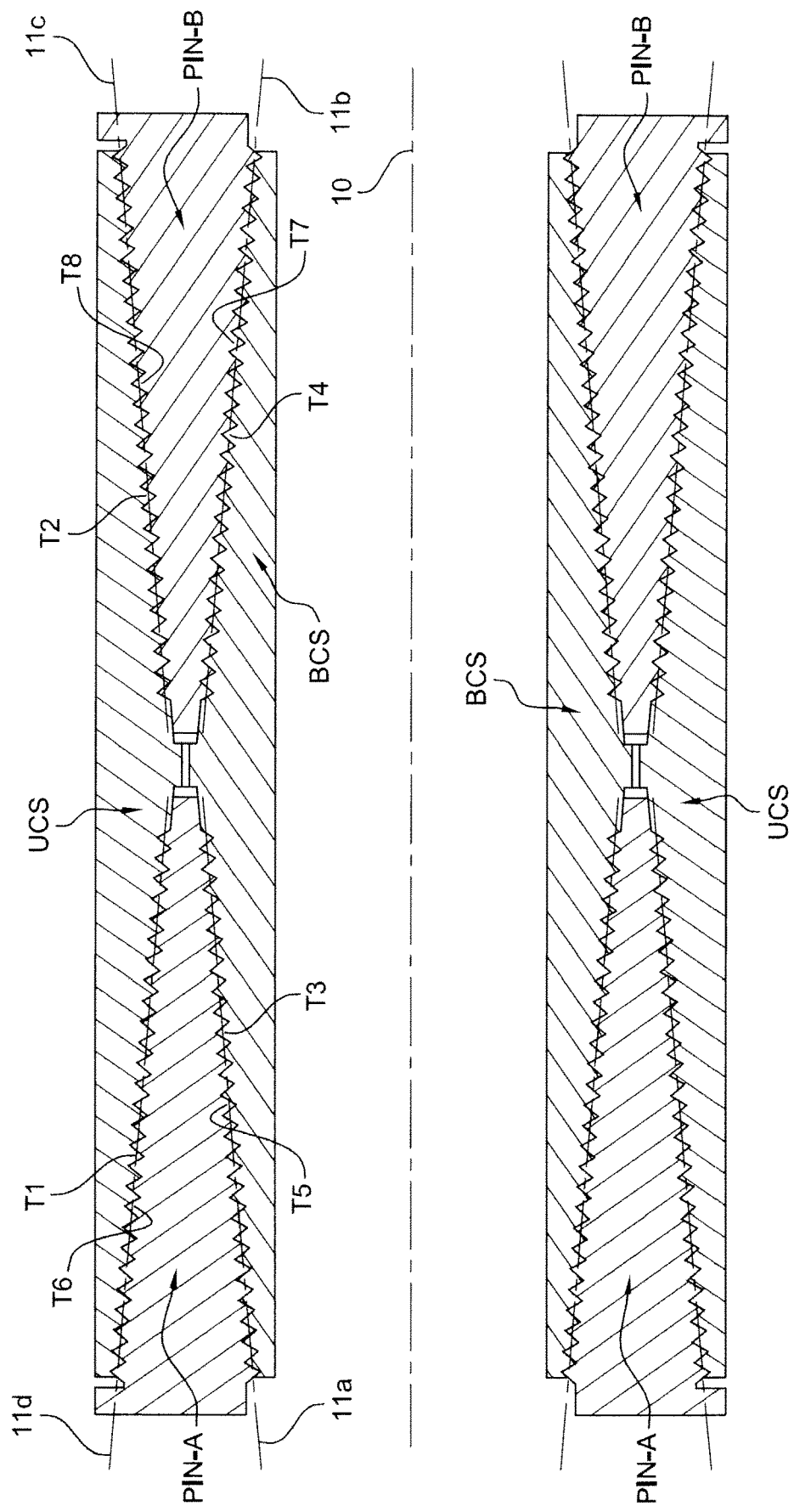
FIG. 1 is a diagrammatic view, in longitudinal section passing through the axis of the connection, of a connection resulting from connecting by makeup an assembly in accordance with one embodiment of the invention.
Figure 2:
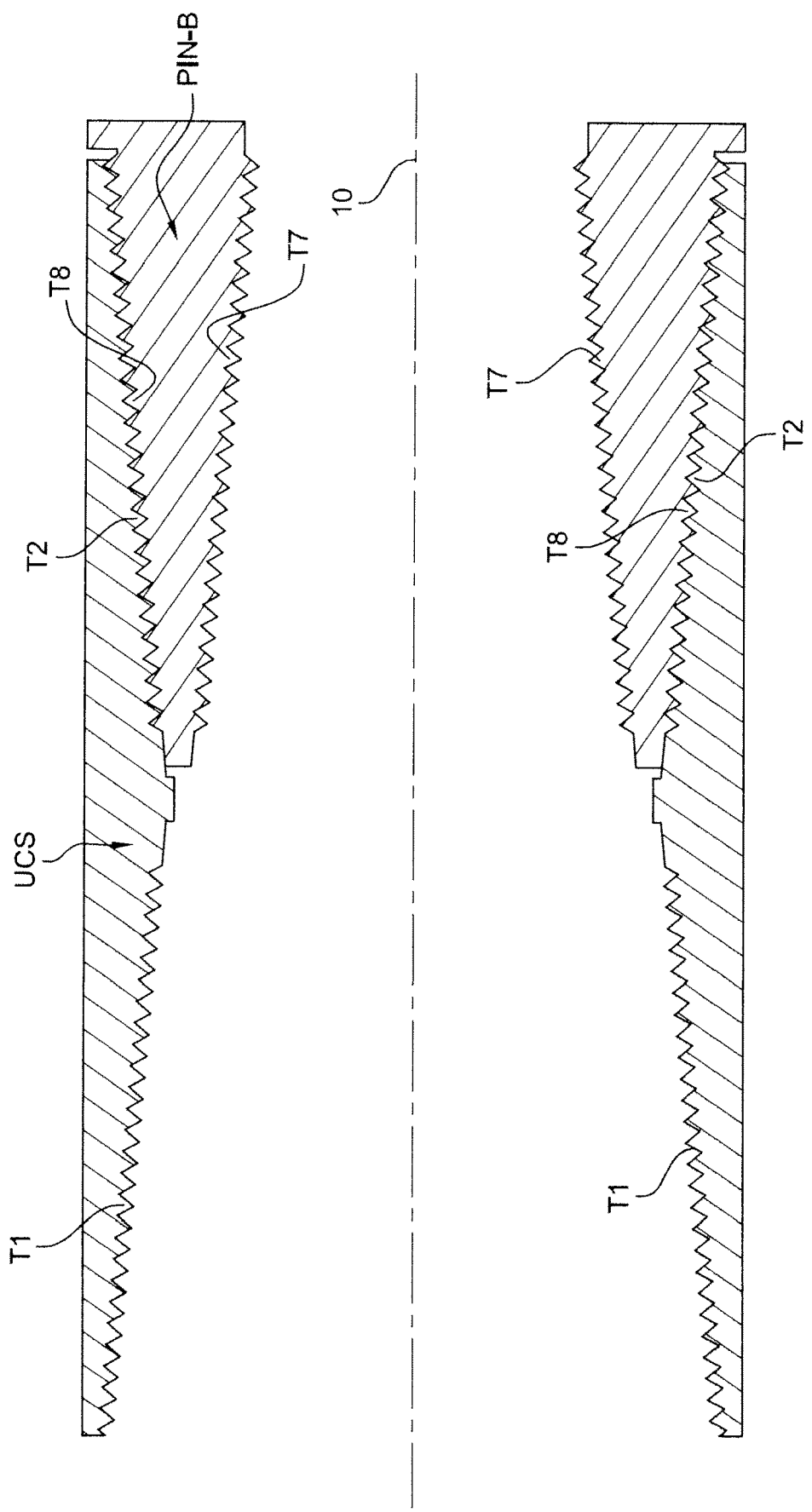
FIG. 2 is a diagrammatic view, in longitudinal section passing through the axis of the connection, of a portion of an assembly in accordance with one embodiment of the invention.
Figure 3:
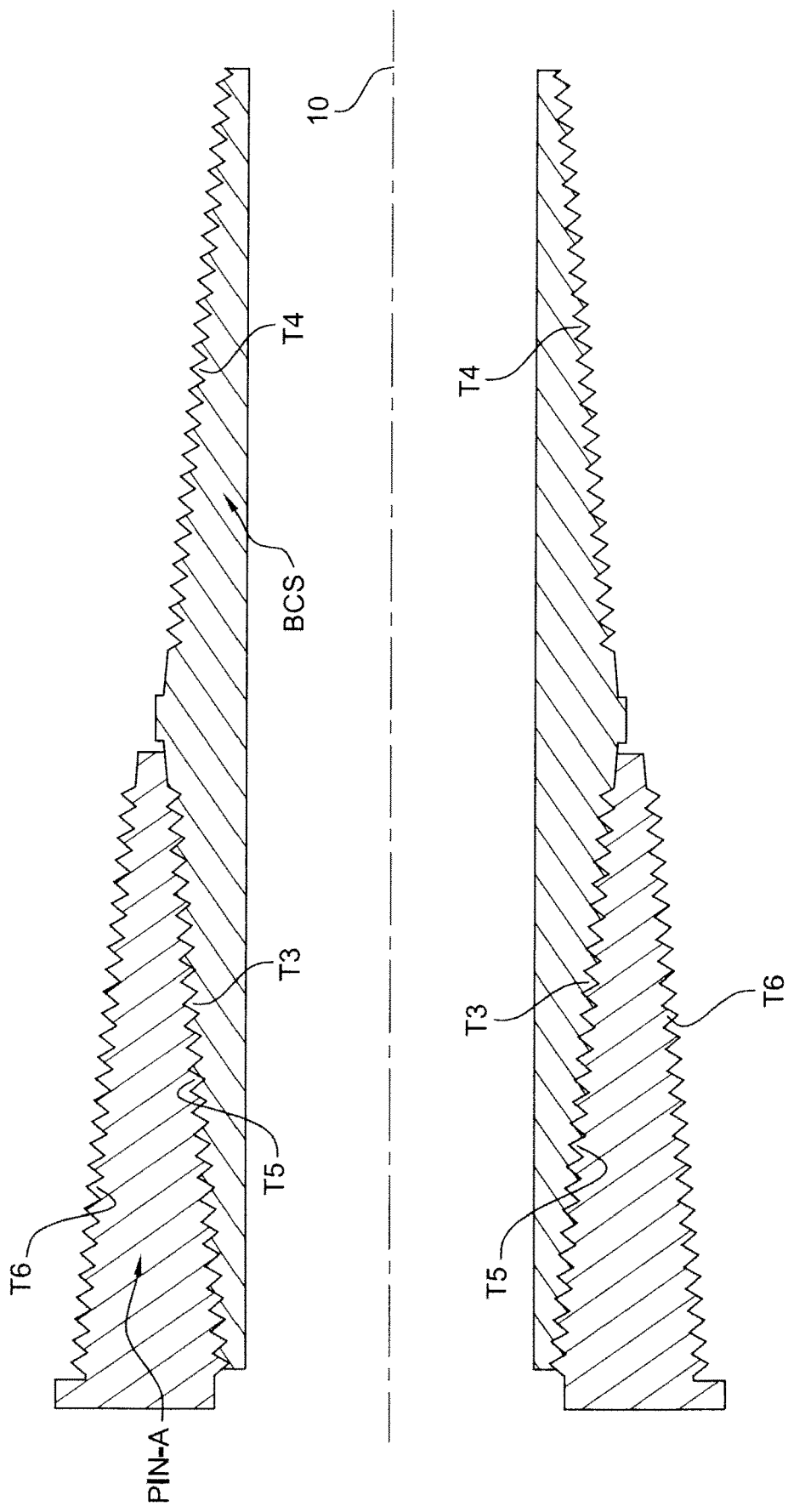
FIG. 3 is a diagrammatic view, in longitudinal section passing through the axis of the connection, of another portion of an assembly in accordance with an embodiment of the invention.

FIG. 1 shows an assembly for producing a threaded connection in accordance with one embodiment of the invention. This connection comprises an axis of revolution 10. It also comprises a first UCS, a second BCS, a third PIN-A and a fourth PIN-B tubular component with an axis of revolution 10.

The first tubular component UCS is provided at each of its end surface with a first, T1, and a second, T2, threaded zone provided on the inner peripheral surface of the component. The first tubular component UCS is a relatively short tube, i.e. in the range 100 to 800 mm. The term "threaded zone" means any zone belonging to the circumferential surface of a tubular component and which comprises a threading, the threading possibly being continuous, interrupted, multiple, simple, regular, irregular, etc. The threaded zones may be of the trapezoidal, self-locking, dovetail or other thread type.

The second tubular component BCS is provided at each of its end surfaces with a third, T3, and a fourth, T4, threaded zone provided on the outer peripheral surface of the component. The second tubular component BCS is also a relatively short length tube, i.e. in the range 100 to 800 mm.

The third tubular component PIN-A is provided at one of its ends with a fifth, T5, and a sixth, T6, threaded zone respectively provided on the inner and outer peripheral surface of the component. The third tubular component PIN-A is a long length tube, i.e. in the range 1000 to 13000 mm.

The fourth tubular component PIN-B is provided at one of its ends with a seventh, T7, and an eighth, T8, threaded zone respectively provided on the inner and outer peripheral surface of the component. The fourth tubular component PIN-B is also a long length tube, i.e. in the range 1000 to 13000 mm.

In accordance with the invention, the first and sixth, third and fifth, second and eighth, fourth and seventh threaded zones are capable of cooperating together in pairs on makeup. The term "cooperate in pairs on makeup" means that the threads of the first threaded zone must be compatible in terms of forms, dimensions, taper, etc., with the threads of the sixth threaded zone. This is the same for the threads of the third threaded zone and the threads of the fifth threaded zone, etc.

For this reason, the pitch of the first and sixth threaded zones must necessarily be equal to the pitch of the fourth and seventh threaded zones, or the pitch of the second and eighth threaded zones has to be equal to the pitch of the third and fifth threaded zones, or the pitch of the first and sixth threaded zones has to be equal to the pitch of the third and fifth threaded zones and the pitch of the second and eighth threaded zones has to be equal to the pitch of the fourth and seventh threaded zones.

Advantageously, and in order to facilitate the progress of makeup, the threaded zones of the tubular components may have a taper, these tapers being denoted 11a, 11b, 11c, 11d on FIG. 1. In this configuration, the sixth threaded zone T6 of the third tubular component PIN-A must necessarily have the same taper 11d as that 11b of the seventh threaded zone T7 of the fourth tubular component PIN-B, or that the fifth threaded zone T5 of the third tubular component PIN-A has the same taper 11a as that 11c of the eighth threaded zone T8 of the fourth tubular component PIN-B.

Advantageously, the taper is in the range 5% to 25%, corresponding to a tangent to the peak half angle in the range 0.025 to 0.125, and preferably a taper in the range 10% to 18%, this corresponding to a tangent to the peak half angle in the range 0.05 to 0.09.

Advantageously, the third and/or fourth tubular component may cooperate in abutment with the first and/or the second tubular component.

Figure 4:
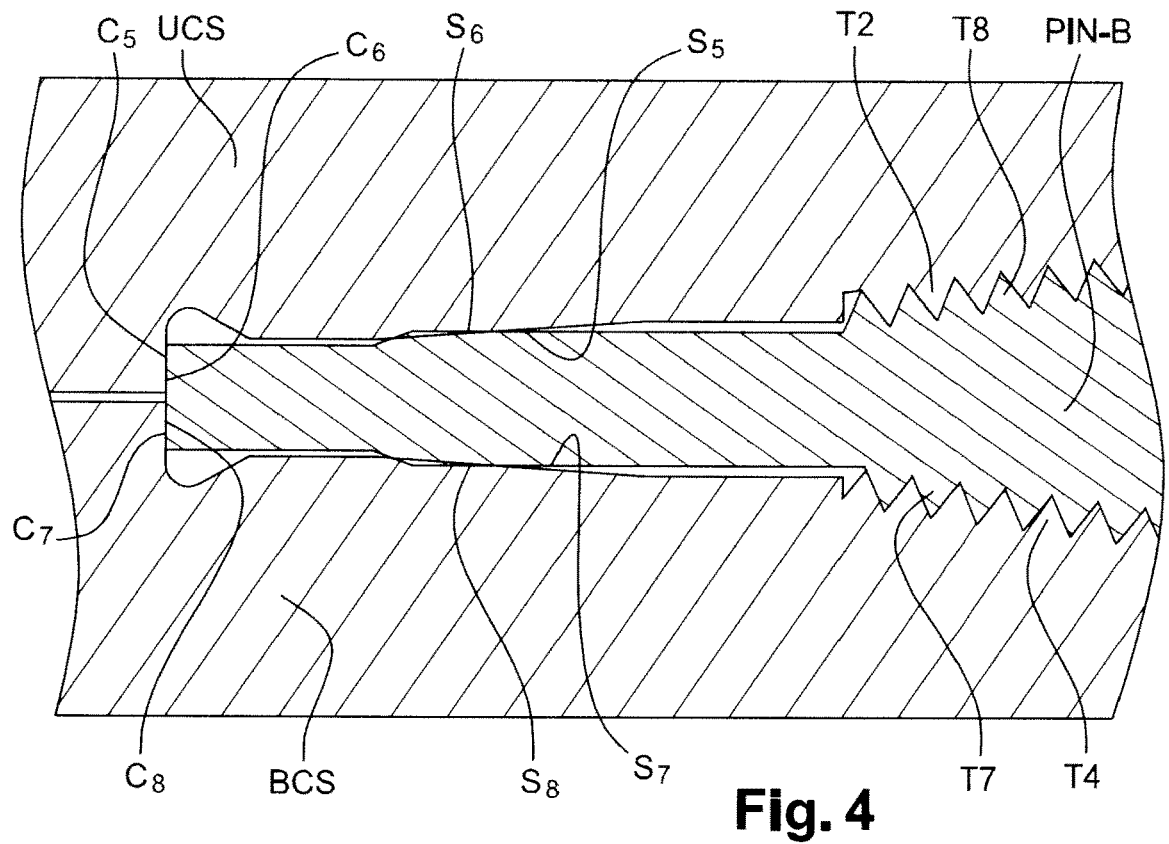
FIG. 4 is a diagrammatic view, in longitudinal section passing through the axis of the connection, of a detail of an assembly in accordance with one embodiment of the invention.
Figure 5:
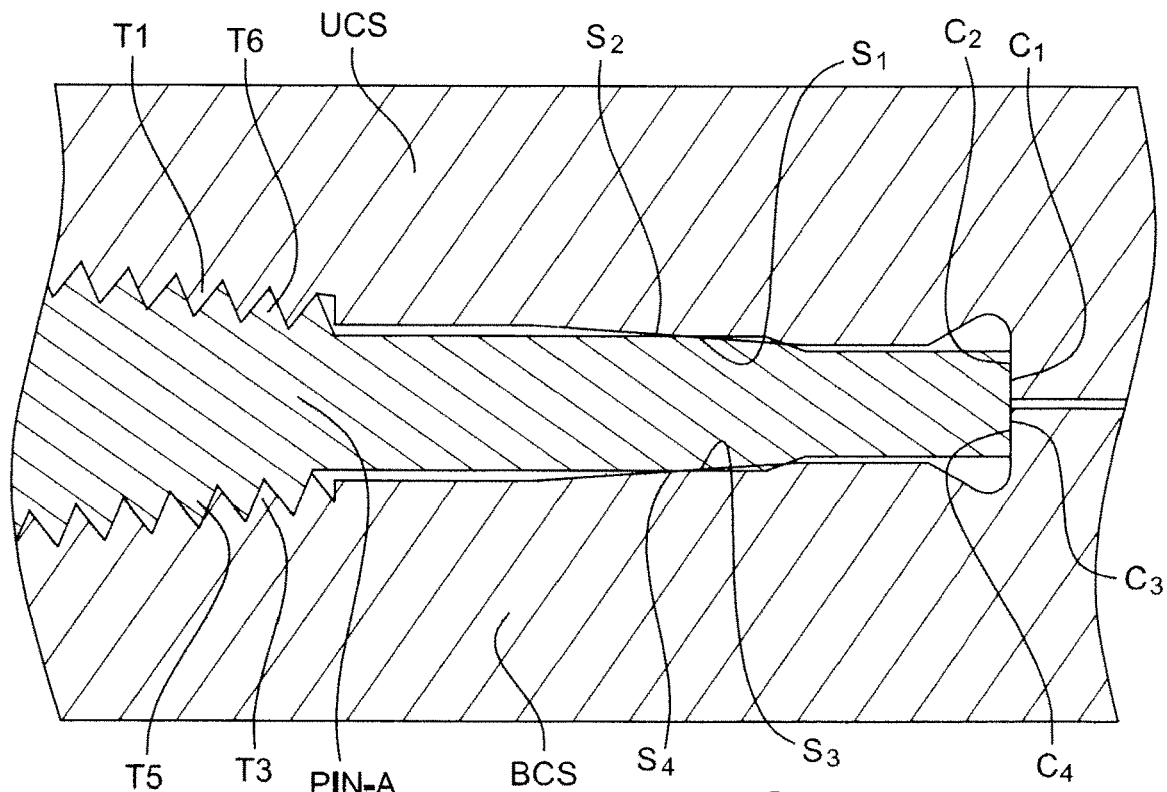
FIG. 5 is a diagrammatic view, in longitudinal section passing through the axis of the connection, of another detail of an assembly in accordance with one embodiment of the invention.

Thus, as can be seen in FIGS. 4 and 5, the third tubular component PIN-A has a terminal end surface extending substantially perpendicular to the axis of revolution 10. The end surface is provided with a first abutment surface C1 which is capable of cooperating in abutment with a corresponding second surface C2 provided on a shoulder of the first tubular component UCS.

Similarly, said end surface is provided with a third abutment surface C3 which is capable of cooperating in abutment with a corresponding fourth surface C4 provided on a shoulder of the second tubular component BCS.

Similarly, the fourth tubular component PIN-B has a terminal end surface extending substantially perpendicular to the axis of revolution 10. The end surface is provided with a fifth abutment surface C5 which is capable of cooperating in abutment with a corresponding sixth surface C6 provided on a shoulder of the first tubular component UCS.

Similarly, said end surface is provided with a seventh abutment surface C7 which is capable of cooperating in abutment with a corresponding eighth surface C8 provided on a shoulder of the second tubular component BCS.

Figure 6:
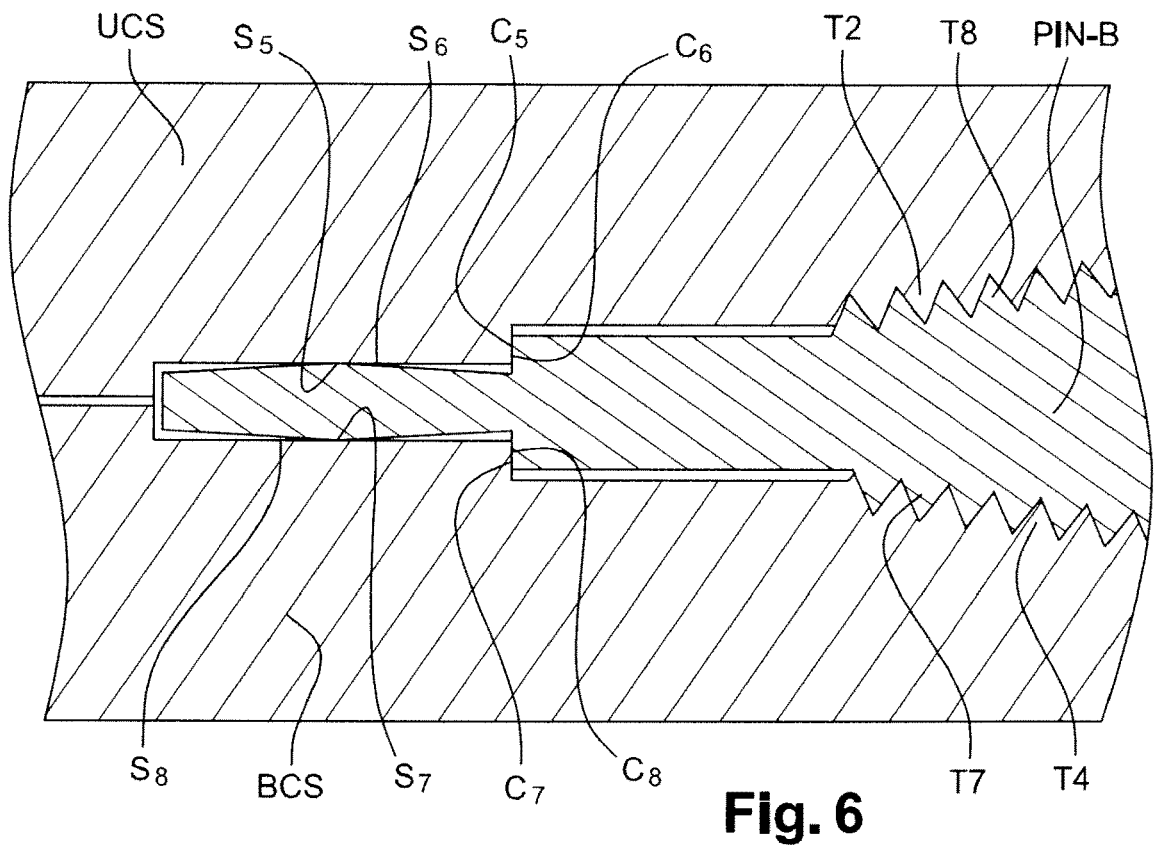
FIG. 6 is a diagrammatic view, in longitudinal section passing through the axis of the connection, of another detail of an assembly in accordance with an embodiment of the invention.
Figure 7:
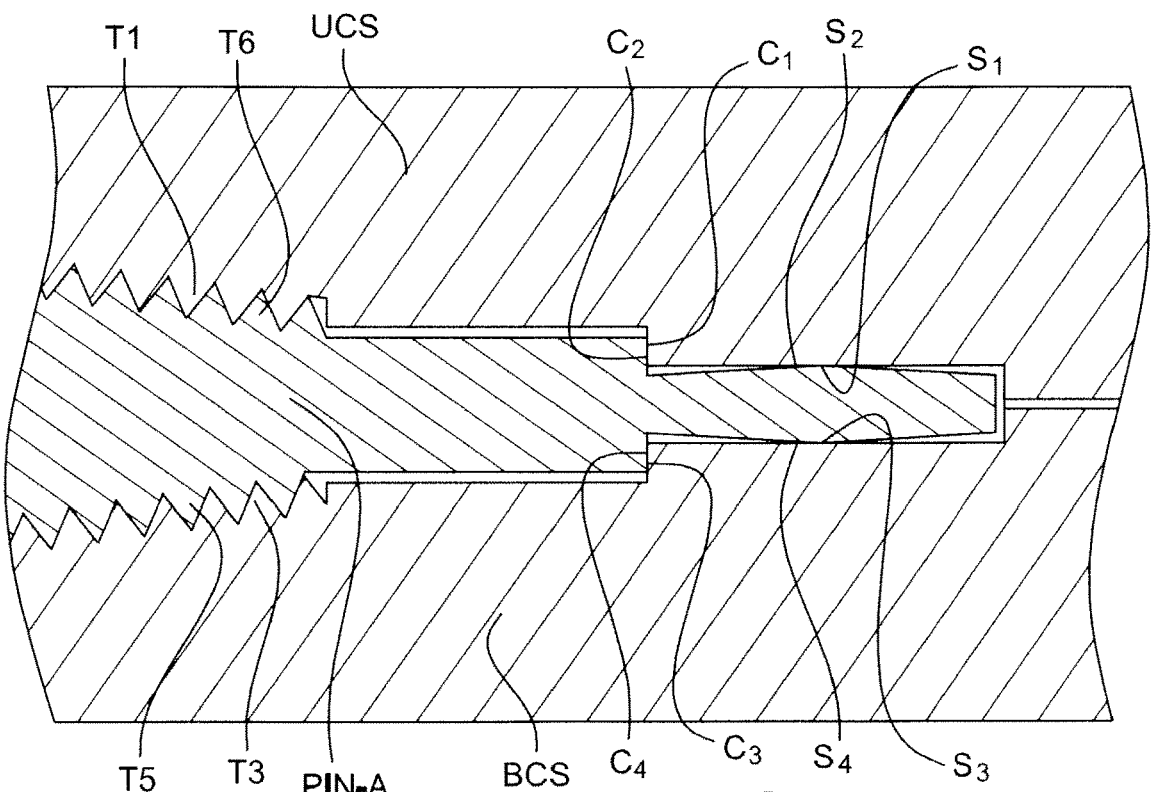
FIG. 7 is a diagrammatic view, in longitudinal section passing through the axis of the connection, of another detail of an assembly in accordance with an embodiment of the invention.

In a variation, and as can be seen in FIGS. 6 and 7, the outer peripheral surface of the third tubular component PIN-A has a shoulder provided with a first abutment surface C1 which is capable of cooperating in abutment with a corresponding second surface C2 provided on a shoulder of the first tubular component UCS.

Similarly, the inner peripheral surface of the third tubular component PIN-A has a shoulder provided with a third abutment surface C3 which is capable of cooperating in abutment with a corresponding fourth surface C4 provided on a shoulder of the second tubular component BCS.

Similarly, the outer peripheral surface of the fourth tubular component PIN-B has a shoulder provided with a fifth abutment surface C5 which is capable of cooperating in abutment with a corresponding sixth surface C6 provided on a shoulder of the first tubular component UCS.

Similarly, the outer peripheral surface of the fourth tubular component PIN-B has a shoulder provided with a seventh abutment surface C7 which is capable of cooperating in abutment with a corresponding eighth surface C8 provided on a shoulder of the second tubular component BCS.

Advantageously, the third and/or fourth tubular component may comprise sealing surfaces which are capable of cooperating in a sealing interference fit with corresponding sealing surfaces provided on the first and/or the second tubular component.

Thus, as can be seen in FIGS. 4 and 5, the third tubular component PIN-A has a non-threaded portion preceding the terminal end, provided with a first sealing surface S1 provided on its outer peripheral surface and which is capable of cooperating in a sealing interference fit with a corresponding second surface S2 provided on the first tubular component UCS.

Similarly, the third tubular component PIN-A is provided with a third sealing surface S3 provided on its inner peripheral surface and which is capable of cooperating in a sealing interference fit with a corresponding fourth surface S4 provided on the second tubular component BCS.

Similarly, the fourth tubular component PIN-B is provided with a fifth sealing surface S5 provided on its outer peripheral surface and which is capable of cooperating in a sealing interference fit with a corresponding sixth surface S6 provided on the first tubular component UCS.

Similarly, the fourth tubular component PIN-B has a non-threaded portion preceding the terminal end provided with a seventh sealing surface S7 provided on its inner peripheral surface and which is capable of cooperating in a sealing interference fit with a corresponding eighth surface S8 provided on the second tubular component BCS.

Advantageously, one of the sealing surfaces is a tapered surface, the other corresponding facing sealing surface being a toroid.

Advantageously again, the toroid surface is a domed toroid convex surface the radius R of which is preferably in the range 2.5 to 60 mm. Too large a radius, i.e. >60 mm, for the toroid surface induces identical disadvantages to those of a cone-on-cone contact. Too small a radius, i.e. <2.5 mm, of this domed surface induces an insufficient contact width.

Facing the toroid sealing surface, the tapered sealing surface is supported by a taper generatrix forming an angle with the axis 10 of the connection the tangent to the peak half angle of which is in the range 0.025 to 0.25, which corresponds to a taper in the range 5% to 50%.

The invention also concerns a method for producing a threaded connection which first of all consists of providing an assembly in accordance with the invention in which the pitch of the first and sixth threaded zones is equal to the pitch of the fourth and seventh threaded zones and in which the sixth threaded zone T6 of the third tubular component PIN-A has the same taper as that of the seventh threaded zone T7 of the fourth tubular component PIN-B. Next, the third tubular component PIN-A is connected by makeup with the second tubular component BCS. Next, the fourth tubular component PIN-B is connected by makeup with the first tubular component UCS. To finish, the resultants of the two preceding steps are connected by makeup.

In another variation, first of all, an assembly in accordance with the invention is provided in which the pitch of the second and eighth threaded zones is equal to the pitch of the third and fifth threaded zones and in which the fifth threaded zone T5 of the third tubular component PIN-A has the same taper as that of the eighth threaded zone T8 of the fourth tubular component PIN-B. Next, the fourth tubular component PIN-B is connected by makeup with the second tubular component BCS. Next, the third tubular component PIN-A is connected by makeup with the first tubular component UCS. Finally, the resultants of the preceding two steps are connected by makeup.

In another variation, first of all an assembly in accordance with the invention is provided in which the first, UCS, and the second, BCS, tubular components are secured together so as to form a single component. This securing together may be carried out by welding, bolting, screwing up, etc.

In addition, the pitch of the first and sixth threaded zones is equal to the pitch of the third and fifth threaded zones and the pitch of the second and eighth threaded zones is equal to the pitch of the fourth and seventh threaded zones. Next, the third tubular component PIN-A is connected by makeup with the component resulting from securing the first, UCS, and second, BCS, tubular components together. Next, the fourth tubular component PIN-B is connected by makeup with the component resulting from securing together of the first, UCS, and the second, BCS, tubular components.

Advantageously, the first, UCS, second, BCS, third, PIN-A, and fourth, PIN-B, tubular components may have threaded zones comprising reverse screwing directions. Thus the first, sixth, fourth and seventh threaded zones T1, T6, T4 and T7 may have a "left handed" screw pitch, while the second, eighth, third and fifth threaded zones T2, T8, T3 and T5 may have a "right handed" screw pitch. Clearly, this has an influence for fitting of the assembly, since the components have to be made up in a predefined order.

Similarly, the first, sixth, third and fifth threaded zones T1, T6, T3 and T5 may have a "left handed" screw pitch, while the second, eighth, fourth and seventh threaded zones T2, T8, T4 and T7 may have a "right handed" screw pitch. This case is adapted to the configuration in which the first, UCS, second, BCS, tubular components have initially been secured together.

This means that the makeup torque during makeup of the assembly can be reached more easily, rendering inadvertent breakout when the made up connection is in service limited or even impossible.

Comparative simulations were carried out on VAM SLIJ-II connections and on connections in accordance with the invention. VAM SLIJ-II connections are integral type connections comprising two staggered threaded zones separated by an intermediate abutment and two sealing surfaces, one inner and the other outer.

Figure 8A:
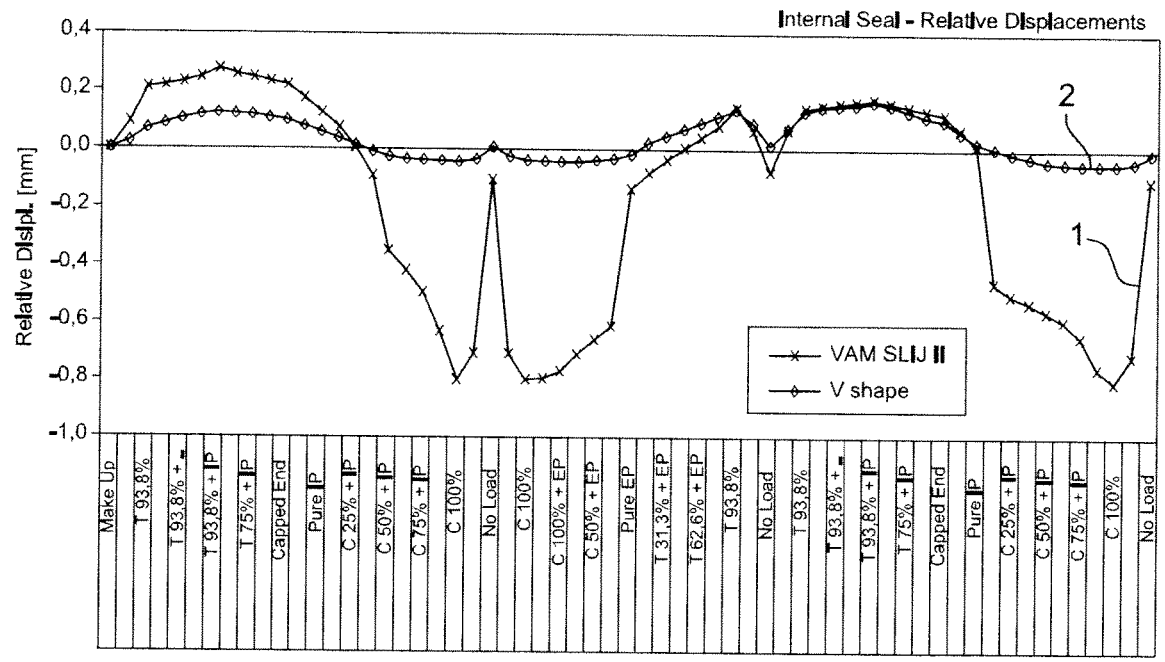
FIGS. 8A and 8B are test graphs.

The graph in FIG. 8A shows, in curve 1, the relative displacement of the inner sealing surfaces in contact for a carbon steel VAM SLIJ-II connection with an outer diameter of 9⅞" (i.e. 250.83 mm), a nominal weight of 62.8 (i.e. a thickness of 15.88 mm) and with a P110 yield strength, i.e. 758 MPa.

Curve 2 of the graph in FIG. 8A shows the relative displacement of the inner sealing surfaces in contact for a carbon steel connection of the invention with an outer diameter of 9⅞" (i.e. 250.83 mm), a nominal weight of 62.8 (i.e. a thickness of 15.88 mm) and with a P110 yield strength, i.e. 758 MPa.

It can clearly be seen that curve 2 keeps close to the horizontal axis. This means that the connection of the invention is less sensitive to applied loads, irrespective of variations in internal pressure IP or external pressure EP, tensile stresses T, compressive loads C, or several of these in combination.

In contrast, curve 1 comprises portions which deviate substantially from the horizontal axis. This means that the VAM SLIJ-II connection is more sensitive to the loads described above.

Figure 8B:
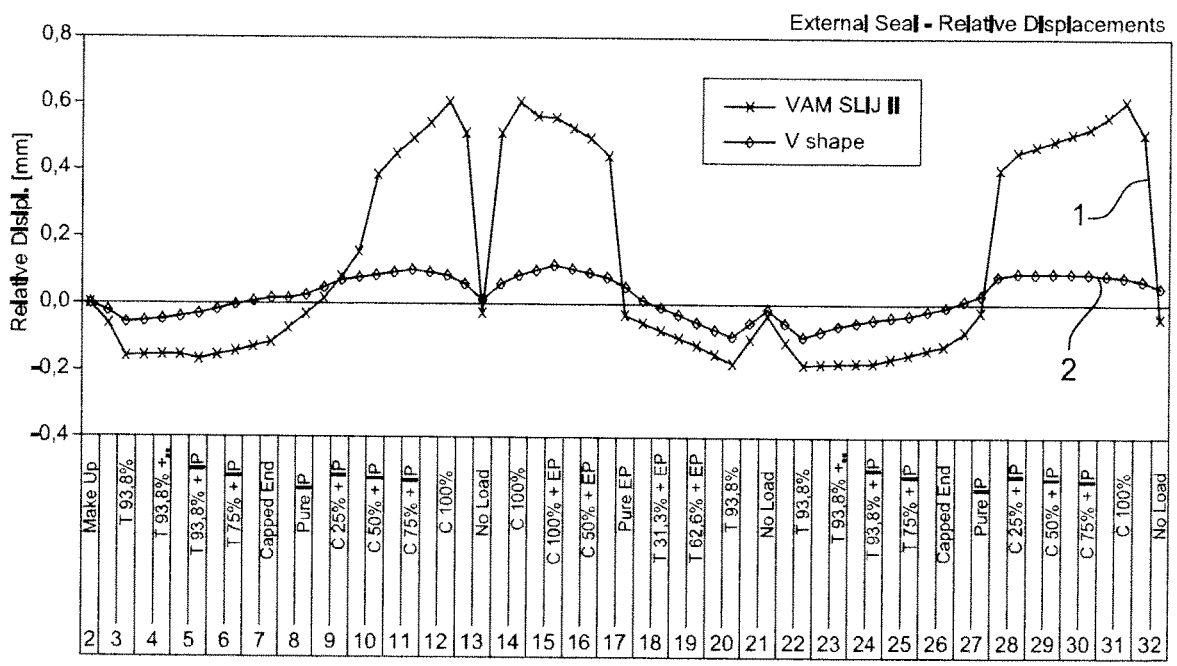

In the graph of FIG. 8B, comparative results are shown between the relative displacement of the external sealing surfaces in contact of the VAM SLIJ-II connection of FIG. 8A and the relative displacement of the sealing surfaces in contact of the connection of the invention, also in FIG. 8A. The conclusions are identical to those of FIG. 8A.

It should be noted that this type of connection is particularly adapted to flush or semi-flush type connections.

It should be noted that the external diameter of the first, UCS, third, PIN-A, and fourth, PIN-B, tubular components may be different, or they may be equal. Preferably, the external diameter of the first tubular component UCS is greater than the external diameter of the third, PIN-A, and fourth, PIN-B, tubular components.

The advantages of having a small relative displacement of the sealing surfaces means that too great a dulling of the surfaces, which could generate micro-grooves during multiple axial displacements and result in a loss of sealing during combined tensile and compressive loads, can be avoided.

This type of connection can be used to maximize the role of sealing surfaces of the first and second tubular components UCS, BCS and to limit the relative displacements thereof in tension and in compression. In addition, this type of connection means that good connection efficiency can be retained with vanishing threads.

The invention claimed is:

1. An assembly for producing a threaded connection, comprising:
   a first, a second, a third, and a fourth tubular component with an axis of revolution;
   the first tubular component including at each of its ends a first and a second threaded zone provided on the inner peripheral surface of the component;
   the second tubular component including at each of its ends a third and a fourth threaded zone provided on the outer peripheral surface of the component;
   the third tubular component including at one of its ends a fifth and a sixth threaded zone respectively provided on the inner and outer peripheral surface of the component;
   the fourth tubular component including at one of its ends a seventh and an eighth threaded zone respectively provided on the inner and outer peripheral surface of the component;
   the first and sixth, third and fifth, second and eighth, fourth and seventh threaded zones configured to cooperate together in pairs on makeup;
   wherein the first, second, third, and fourth tubular components are separately provided,
   wherein for a plane that extends through the axis of revolution and extends through each of the first and second tubular components but does not extend though the third and fourth tubular components, the third tubular component is positioned only on a first side of the plane and the fourth tubular component is positioned only on a second side of the plane opposite to the first side,
   wherein the pitch of the first and sixth threaded zones located on the first side of the plane is equal to the pitch of the fourth and seventh threaded zones located on the second side of the plane, and the sixth threaded zone of the third tubular component located on the first side of the plane has a same taper as that of the seventh threaded zone of the fourth tubular component located on the second side of the plane, the taper being in a range 5% to 25%, corresponding to a tangent to the peak half angle in a range 0.025 to 0.125, and
   wherein the outer peripheral surface of the third tubular component includes a non-threaded portion preceding its terminal end, including a first sealing surface configured to cooperate in a sealing interference fit with a corresponding second surface provided on the first tubular component.

2. An assembly for producing a threaded connection according to claim 1, wherein the pitch of the second and eighth threaded zones is equal to the pitch of the third and fifth threaded zones, and the fifth threaded zone of the third tubular component has a same taper as that of the eighth threaded zone of the fourth tubular component, the taper being in a range 5% to 25%, corresponding to a tangent to the peak half angle in a range 0.025 to 0.125.

3. An assembly for producing a threaded connection according to claim 1, wherein the third tubular component includes a terminal end surface extending perpendicular to the axis of revolution, the end surface including a first abutment surface configured to cooperate in abutment with a corresponding second surface provided on a shoulder of the first tubular component and the end surface including a third abutment surface configured to cooperate in abutment with a corresponding fourth surface provided on a shoulder of the second tubular component.

4. An assembly for producing a threaded connection according to claim 1, wherein the fourth tubular component includes a terminal end surface extending perpendicular to the axis of revolution, the end surface including a fifth abutment surface configured to cooperate in abutment with a corresponding sixth surface provided on a shoulder of the first tubular component and the end surface including a seventh abutment surface configured to cooperate in abutment with a corresponding eighth surface provided on a shoulder of the second tubular component.

5. An assembly for producing a threaded connection according to claim 1, wherein the outer peripheral surface of the third tubular component includes a shoulder including a first abutment surface configured to cooperate in abutment with a corresponding second surface provided on a shoulder of the first tubular component and its inner peripheral surface includes a shoulder including a third abutment surface configured to cooperate in abutment with a corresponding fourth surface provided on a shoulder of the second tubular component.

6. An assembly for producing a threaded connection according to claim 5, wherein the outer peripheral surface of the fourth tubular component includes a shoulder including a fifth abutment surface configured to cooperate in abutment with a corresponding sixth surface provided on a shoulder of the first tubular component and its inner peripheral surface includes a shoulder including a seventh abutment surface configured to cooperate in abutment with a corresponding eighth surface provided on a shoulder of the second tubular component.

7. An assembly for producing a threaded connection according to claim 5, wherein sealing surfaces of the third and fourth tubular components are respectively provided between the shoulders carrying abutment surfaces of the first and second tubular components and a free end of the first and second tubular components.

8. An assembly for producing a threaded connection according to claim 1, wherein the inner peripheral surface of the third tubular component includes a non-threaded portion preceding its terminal end, including a third sealing surface configured to cooperate in a sealing interference fit with a corresponding fourth surface provided on the second tubular component.

9. An assembly for producing a threaded connection according to claim 1, wherein the outer peripheral surface of the fourth tubular component includes a non-threaded portion preceding its terminal end, including a fifth sealing surface configured to cooperate in a sealing interference fit with a corresponding sixth surface provided on the first tubular component.

10. An assembly for producing a threaded connection according to claim 1, wherein the inner peripheral surface of the fourth tubular component includes a non-threaded portion preceding its terminal end, including a seventh sealing surface configured to cooperate in a sealing interference fit with a corresponding eighth surface provided on the second tubular component.

11. An assembly for producing a threaded connection according to claim 1, wherein one of the first and second surfaces is a tapered surface, the corresponding of the first and second surfaces being a toroid with a radius R in a range 2.5 to 60 mm.

12. An assembly for producing a threaded connection according to claim 1, wherein the first and second tubular components are integral such that they form a single component, the pitch of the first and sixth threaded zones being equal to the pitch of the third and fifth threaded zones and the pitch of the second and eighth threaded zones being equal to the pitch of the fourth and seventh threaded zones.

13. An assembly for producing a threaded connection according to claim 1, wherein the first tubular component is separable from the second tubular component.

14. A threaded connection resulting from making up an assembly according to claim 1.

15. An assembly for producing a threaded connection, comprising:
a first, a second, a third, and a fourth tubular component with an axis of revolution, the first tubular component being separable from the second tubular component;
the first tubular component including at each of its ends a first and a second threaded zone provided on the inner peripheral surface of the component;
the second tubular component including at each of its ends a third and a fourth threaded zone provided on the outer peripheral surface of the component;
the third tubular component including at one of its ends a fifth and a sixth threaded zone respectively provided on the inner and outer peripheral surface of the component;
the fourth tubular component including at one of its ends a seventh and an eighth threaded zone respectively provided on the inner and outer peripheral surface of the component;
the first and sixth, third and fifth, second and eighth, fourth and seventh threaded zones configured to cooperate together in pairs on makeup; and
wherein the first, second, third, and fourth tubular components are separately provided,
wherein for a plane that extends through the axis of revolution and extends through each of the first and second tubular components but does not extend though the third and fourth tubular components, the third tubular component is positioned only on a first side of the plane and the fourth tubular component is positioned only on a second side of the plane opposite to the first side,
wherein the pitch of the second and eighth threaded zones located on the second side of the plane being equal to the pitch of the third and fifth threaded zones located on the first side of the plane,
wherein the pitch of the first and sixth threaded zones located on the first side of the plane is equal to the pitch of the fourth and seventh threaded zones located on the second side of the plane, and the sixth threaded zone of the third tubular component located on the first side of the plane has a same taper as that of the seventh threaded zone of the fourth tubular component located on the second side of the plane, the taper being in a range 5% to 25%, corresponding to a tangent to the peak half angle in a range 0.025 to 0.125, and
wherein the outer peripheral surface of the third tubular component includes a non-threaded portion preceding its terminal end, including a first sealing surface configured to cooperate in a sealing interference fit with a corresponding second surface provided on the first tubular component.

16. An assembly for producing a threaded connection, comprising:
a first, a second, a third, and a fourth tubular component with an axis of revolution, the first tubular component being separable from the second tubular component;
the first tubular component including at each of its ends a first and a second threaded zone provided on the inner peripheral surface of the component;
the second tubular component including at each of its ends a third and a fourth threaded zone provided on the outer peripheral surface of the component;
the third tubular component including at one of its ends a fifth and a sixth threaded zone respectively provided on the inner and outer peripheral surface of the component;
the fourth tubular component including at one of its ends a seventh and an eighth threaded zone respectively provided on the inner and outer peripheral surface of the component;
the first and sixth, third and fifth, second and eighth, fourth and seventh threaded zones configured to cooperate together in pairs on makeup; and
the pitch of the first and sixth threaded zones being equal to the pitch of the third and fifth threaded zones and the pitch of the second and eighth threaded zones being equal to the pitch of the fourth and seventh threaded zones,
wherein the first, second, third, and fourth tubular components are separately provided, wherein for a plane that extends through the axis of revolution and extends through each of the first and second tubular components but does not extend though the third and fourth tubular components, the third tubular component is positioned only on a first side of the plane and the fourth tubular component is positioned only on a second side of the plane opposite to the first side, wherein the pitch of the first and sixth threaded zones located on the first side of the plane is equal to the pitch of the fourth and seventh threaded zones located on the second side of the plane, and the sixth threaded zone of the third tubular component located on the first side of the plane has a same taper as that of the seventh threaded zone of the fourth tubular component located on the second side of the plane, the taper being in a range 5% to 25%, corresponding to a tangent to the peak half angle in a range 0.025 to 0.125, and wherein the outer peripheral surface of the third tubular component includes a non-threaded portion preceding its terminal end, including a first sealing surface configured to cooperate in a sealing interference fit with a corresponding second surface provided on the first tubular component.

\* \* \* \* \*